Jan. 12, 1932.  L. BALAZINSKI  1,840,348

GAS COCK

Filed Nov. 23, 1929

INVENTOR.

Louis Balazinski.

Patented Jan. 12, 1932

1,840,348

UNITED STATES PATENT OFFICE

LOUIS BALAZINSKI, OF EAST PORTCHESTER, CONNECTICUT

GAS COCK

Application filed November 23, 1929. Serial No. 409,354.

This invention relates to certain new and useful improvements in safety gas cocks for gas ranges, and has for its primary object to provide a safety attachment for a gas cock or a valve in the form of a device requiring manual operation to open an auxiliary tensioned valve subsequently to the opening of the main valve so that persons, especially children, unfamiliar with the operation of the mechanism will find it impossible to effect the flow of gas upon opening the main valve.

A further object of the invention is to provide a gas cock for gas ranges comprising a structure embodying a main flow gas valve that is manually operated and an auxiliary tensioned valve to be manually opened subsequently to opening movement of the main valve with a device that is manually operated for opening the auxiliary valve and is associated with the main valve to be operated thereby to be shifted to a position whereby the auxiliary tensioned valve is closed during closing movement of the main valve.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1:
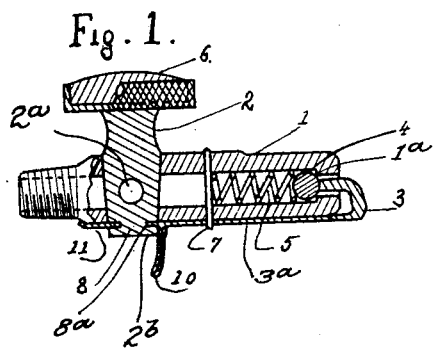
Figure 1 is a vertical longitudinal sectional view of a gas cock for gas ranges constructed in accordance with the present invention showing the main and auxiliary valves and the manually operated device associated with the two valves.

The gas cock embodies a valve body 1 having a longitudinal gas passage therethrough and a transverse opening tapered as illustrated in Figure 1 for the reception of the tapered valve 2 having a transverse port 2a therein which when aligned with the valve body bore permits the flow of gas. A disk handle 6 is carried by the valve 2 and on its upper face carries oppositely extending arrow indications 9 parallel with the transverse port 2a to indicate the position of the port 2a relative to the valve body passage so that it may be determined when the valve stem is positioned to permit the flow of gas.

One end of the valve body 1 is provided with a valve seat 1a forming a part of the passage through the valve body and is adapted to be engaged by the ball valve 4 freely mounted in the passage and influenced in a direction toward its seat by the coil spring 5, the other end of the spring 5 abutting the pin 7 extending transversely of the valve body.

Figure 3:
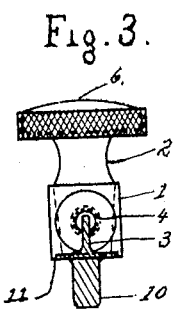
Figure 3 is an end elevational view.
Figure 2:
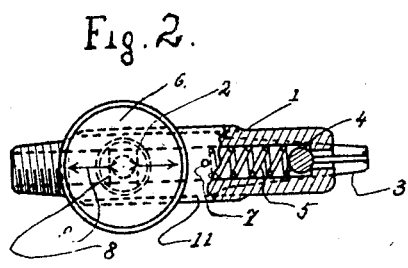
Figure 2 is a top plan view, partly in section.
Figure 4:
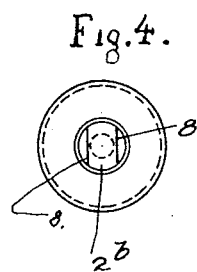
Figure 4 is a bottom plan view of the main valve.

The safety feature of the gas cock embodies a plate 3a slidably mounted in engagement with the flat underside of the valve body 1 and carrying a reversely curved finger 3 at one end that extends through an end opening in the valve body for engagement with the ball valve 4 to unseat the same against the power of the spring 5. The plate 3a carries a finger piece 10 depending therefrom intermediate its ends as shown in Figures 1 and 3 and is further provided with a pair of side legs 11 resulting from a bifurcation that engage in opposite sides of an annular groove 8a in the lower end of the valve 2 that projects laterally of the valve body 1. The projecting end of the valve 2 as shown in Figures 2 and 4 is flattened at opposite sides as at 8, outwardly of the annular groove 8a for cooperation with the finger piece 10 of the sliding plate 3a as will now be described.

When the valve 2 is in the closed position shown in Figure 1, the flattened sides 8 of the projecting end of the valve extend longitudinally of the valve body 1 to cause the shoulder 2b to be engaged with the finger piece 10 of the sliding plate 3a to move the latter longitudinally of the valve body and to displace the curved end 3 thereof relative to the ball valve 4 to permit the spring 5 to move the ball valve onto its seat. When the valve 2 is rotated, to open the same, by aligning the transverse port 2a with the passage through the valve body, the arrows 9 carried by the handle 6 indicate such open position and the shoulder 2b upon the valve is displaced relative to the finger piece 10, the ball valve 4 still remaining on its seat to prevent the flow of gas. To render the valve effective, it is required that the finger piece 10 be gripped for moving the plate 3a and the curved end 3 into engagement with the ball valve 4 to unseat the same against the tension of the spring and at which time the gas flows freely through the valve body. The frictional contact between the sliding plate 3a and the valve body is sufficient to overcome the power of the spring 5 and the ball valve 4 remains in its open position until the plate 3a is again shifted by rotating the valve 2 to cause the shoulder 2b thereof to engage the finger piece 10 for shifting the plate 3a.

From the above detailed description of the invention, it is believed that the construction and operation of the invention will be apparent and while there are herein shown and described the preferred embodiments of the invention, it is nevertheless to be understood that minor changes may be made therein without departing from the spirit and scope of the invention as claimed.

I claim:—

In a gas valve of the character described, a valve body open at opposite ends, a main valve set in the body, an auxiliary valve at one end opening, a spring engaging the auxiliary valve to hold the same on its seat, a plate slidably mounted on the valve body with a finger extension entering one end of the valve body for engagement with the auxiliary valve, an abutment on the plate engageable with the main valve to be operated thereby for permitting seating of the auxiliary valve, said abutment comprising a finger piece for manually unseating the auxiliary valve.

LOUIS BALAZINSKI.